United States Patent [19]

Kang

[11] Patent Number: 5,595,105
[45] Date of Patent: Jan. 21, 1997

[54] APPARATUS FOR AUTOMATICALLY COOKING RICE

[76] Inventor: Sung-Phil Kang, 420 Ji-dong, Paldal-gu, Suwon-city, Kyunggi-do, 442-060, Rep. of Korea

[21] Appl. No.: 522,153

[22] Filed: Aug. 31, 1995

[30] Foreign Application Priority Data

Dec. 30, 1994 [KR] Rep. of Korea .................. 94-39758

[51] Int. Cl.$^6$ ............................................. A47J 27/00
[52] U.S. Cl. ........................... 99/327; 99/330; 99/332; 99/335; 99/352; 99/403; 99/407; 99/536; 219/441; 219/492; 219/506
[58] Field of Search ................. 99/330, 334–336, 99/403–410, 417, 443 R, 443 C, 483, 516; 426/511, 510, 523, 461, 462, 508, 618; 219/506, 440–442, 492, 494, 400, 401, 433–435; 968/977, DIG. 1; 340/650, 660

[56] References Cited

U.S. PATENT DOCUMENTS

| | | |
|---|---|---|
| 4,155,293 | 5/1979 | Spiel et al. ........................... 99/352 |
| 4,181,072 | 1/1980 | Hirahara . |
| 4,338,344 | 7/1982 | Brooks et al. . |
| 4,561,347 | 12/1985 | Zaitu .......................... 426/511 X |
| 4,672,179 | 6/1987 | Onishi et al. ....................... 219/441 |
| 4,687,910 | 8/1987 | Aoshima et al. ..................... 99/342 |
| 4,934,259 | 6/1990 | Watanabe . |
| 5,156,082 | 10/1992 | Fukuda et al. ......................... 99/326 |

FOREIGN PATENT DOCUMENTS

2256127 12/1992 United Kingdom .

Primary Examiner—Timothy F. Simone
Attorney, Agent, or Firm—Finnegan, Henderson, Farabow, Garrett & Dunner

[57] ABSTRACT

An automatic rice cooking apparatus including a rice washing section supplied with a predetermined amount of rice from a rice box via a measuring cup and adapted to wash the rice by a water supplied at a uniform water pressure and a rice cooker adapted to receive the washed rice and a water for boiling the rice controlled in quantity by a water supply time and achieve a cooking operation and a warmth-keeping operation. The apparatus includes a control circuit capable of automatically achieving all rice cooking procedures of measuring the amount of rice to be cooked, washing the rice, adjusting the quantity of water for boiling the rice, cooking the rice and keeping the cooked rice warm in accordance with a selected specification of a user. The control circuit also informs various operation states of the apparatus so that the user uses the apparatus conveniently and simply.

2 Claims, 8 Drawing Sheets

APPARATUS FOR AUTOMATICALLY COOKING RICE

BACKGROUND OF THE INVENTION

1. Field of the Invention

The present invention relates to an apparatus for automatically cooking rice and a method for controlling the same, and more particularly to an automatic rice cooking apparatus capable of efficiently controlling a rice cooking procedure involving the steps of receiving an appropriate amount of rice from an upper rice box, washing the rice, pouring the washed rice in a lower rice cooker together with a water for boiling the rice, automatically cooking the rice with a desired amount and a desired rice taste and keeping the cooked rice warm.

2. Description of the Prior Art

A general procedure of cooking rice involves the steps of manually washing rice, pouring the washed rice in a rice cooker, supplying a water for boiling the rice in an appropriate quantity measured with eye, hand or a measure cup, and then boiling the rice for a predetermined time.

Where the rice is excessively washed during the manual washing procedure, embryo buds of rice may be undesirably washed out. Where the rice is insufficiently washed, there may be generated the hygiene problem. Since the quantity of the water for boiling the rice is measured by a rough estimate, it may be inaccurate in association with the amount of rice. As a result, there is frequently generated a problem that the rice comes out soft or hard.

SUMMARY OF THE INVENTION

Therefore, an object of the invention is to solve the above-mentioned problems encountered in the prior art and, thus, to provide an automatic rice cooking apparatus capable of automatically achieving all rice cooking procedures of measuring the amount of rice to be cooked, washing the rice, adjusting the quantity of water for boiling the rice, cooking the rice and keeping the cooked rice warm, and a method for controlling the automatic rice cooking apparatus.

Another object of the invention is to provide an automatic rice cooking apparatus capable of accurately adjusting the quantity of water for boiling rice while washing the rice by a water supplied from the outside.

In order to accomplish these objects, the present invention provides an automatic rice cooking apparatus including a rice washing section supplied with a predetermined amount of rice from a rice box via a measuring cup and adapted to wash the rice by a water supplied at a uniform water pressure and a rice cooker adapted to receive the washed rice and a water for boiling the rice controlled in quantity by a water supply time and achieve a cooking operation and a warmth-keeping operation. The apparatus includes a control circuit capable of automatically achieving all rice cooking procedures of measuring the amount of rice to be cooked, washing the rice, adjusting the quantity of water for boiling the rice, cooking the rice and keeping the cooked rice warm in accordance with a selected specification of a user. The control circuit also informs various operation states of the apparatus so that the user uses the apparatus conveniently and simply.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figures 1, 1A:
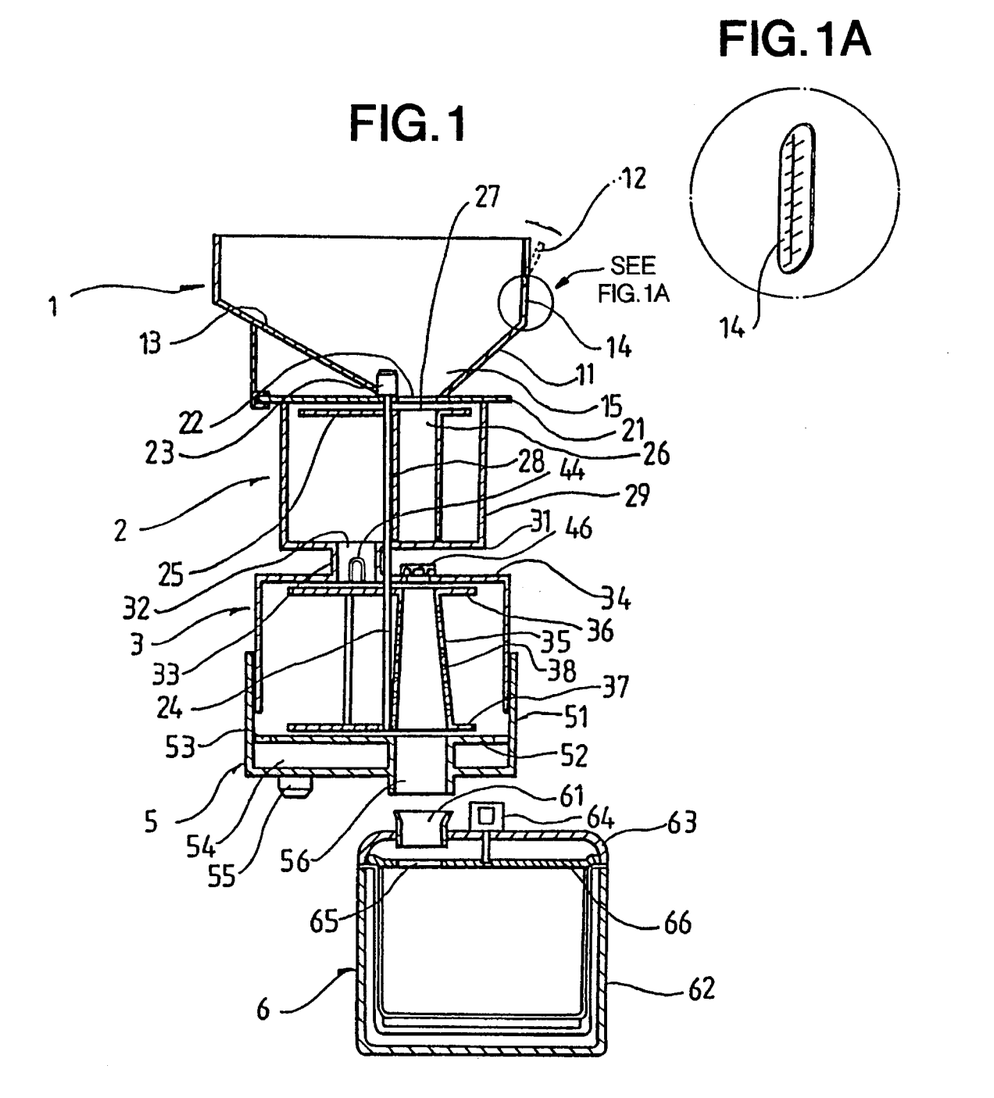
FIG. 1 is a sectional view illustrating an automatic rice cooking apparatus in accordance with the present invention.

Referring to FIG. 1, there is illustrated an automatic rice cooking apparatus in accordance with the present invention.

As shown in FIG. 1, the automatic rice cooking apparatus includes a rice receiving section 1 having a rice box 11. Provided at the front wall of the rice box 11 is a rice inlet port for pouring rice in the rice box 11. A slant plate 13 is disposed in the rice box 11. The slant plate 13 is integral with the rice box 11 and adapted to guide a smooth feeding of rice. The rice receiving section 1 also has a vertically extending window 14 formed at the front wall of the rice box 11 and adapted to check the amount of rice contained in the rice box 11.

The automatic rice cooking apparatus also includes a measuring section 2 disposed beneath the rice receiving section 1. The measuring section 2 has an upper plate 21 attached to the lower end of the rice receiving section 1 and provided with a throughout hole 22 communicated with an outlet 15 of the rice box 11. A rotating plate 25 is disposed beneath the upper plate 21. The rotating plate 25 is mounted to a rotating shaft 24 coupled to a motor 23 such that it is rotated by a drive force of the motor 23. The rotating plate 25 is provided at one side portion thereof with a throughout hole 26. As the rotating plate 25 rotates, the throughout hole 26 is selectively vertically aligned with the throughout hole 22 of the upper plate 21 so that the throughout hole 22 is downward opened. Between the upper plate 21 and the rotating plate 25, a space 27 is defined. The space 27 serves to prevent rice from being jammed between the upper plate 21 and the rotating plate 25 and thereby broken during the rotation of the rotating plate 25. A measuring cup 28 is attached to the lower end of the rotating plate 25. Preferably, the measuring cup 28 is integral with the rotating plate 25. The measuring cup 28 has an upper end directly communicated with the throughout hole 26 of the rotating plate 25 and an opened lower end. By such a construction, the measuring cup 28 is supplied with a rice portion for one person every time when the rotation plate 25 rotates one revolution. The measuring section 2 also has a cylindrical side wall 29 downward extending from the upper plate 21 to serve as a casing of the measuring section 2 and a measuring cup support plate 31 mounted to the lower end of the side wall 29. The measuring cup support plate 31 has a throughout hole 32 selectively aligned with the lower end of the measuring cup 28 during the rotation of the measuring cup 28.

The automatic rice cooking apparatus further includes a rice washing section 3 disposed beneath the measuring section 2 and connected to the measuring section 2 by a rice feeding pipe 33. The rice feeding pipe 33 is integral with the measuring cup support plate 31 such that its upper end communicates with the throughout hole 32 of the measuring cup support plate 31. The rice washing section 3 has an upper cover plate 34 integrally formed with the rice feeding pipe 33 such that the rice contained in the measuring cup 28 is downward fed to the rice washing section 3 through the rice feeding pipe 33 when the measuring cup 28 is aligned with the rice feeding pipe 33 during its rotation by the motor 23. Disposed beneath the upper cover plate 34 is an upper inner plate 36 mounted to the rotating shaft 24 such that it rotates by the drive force of the motor 23. A lower inner plate 37 is also mounted to the rotating shaft 24 such that it is downward spaced a predetermined distance from the upper inner plate 36. The rice washing section 3 also has a washing bath 35 disposed between and integrally formed with the upper inner plate 36 and the lower inner plate 37. The washing bath 35 receives the rice from the measuring section 2 when it is aligned with the rice feeding pipe 33. The washing bath 35 has a plurality of water drain ports 38 and serves to wash the rice fed thereto by an injection water supplied thereto at a high pressure.

A water drain section 5 is disposed beneath the rice washing section 3. The water drain section 5 has a cylindrical lower cover plate 51 coupled to the upper cover plate 34. Disposed in the lower cover plate 51 is an intermediate plate 52 having a plurality of water drain ports 53. The intermediate plate 52 is disposed just beneath the lower inner plate 37 of the rice washing section 3. A water collecting chamber 54 is defined between the intermediate plate 52 and the bottom portion of the lower cover plate 51. The water drain section 5 also has a water drain port 55 provided at the bottom portion of the lower cover plate 51 and adapted to outwardly drain a water collected in the water collecting chamber 54. A rice discharge pipe 56 extends downward from the intermediate plate 52 across the lower cover plate 51. Preferably, the rice discharge pipe 56 is integral with both the intermediate plate 52 and the lower cover plate 51. The rice discharge pipe 56 serves to downward discharge the rice washed in the washing bath 35 when it is aligned with the washing bath 35.

Finally, the automatic rice cooking apparatus includes a rice cooking section 6 disposed beneath the water drain section 5. The rice cooking section 6 has a rice receiving hopper 61 disposed beneath the rice discharge pipe 56 and adapted to receive the washed rice from the rice discharge pipe 56. The rice cooking section 6 also has a rice cooker 62 having a lid 63 hinged to a cooker body. The rice cooker 62 is laid on a shelf slidably mounted to a base (not shown). The rice receiving hopper 61 is provided at an appropriate portion of the lid 63. To the lower end of the lid 63, a rotating opening/closing plate 66 having a rice receiving hole 65 is attached. The rotating opening/closing plate 66 can be rotated by a motor 64 mounted to the upper surface of the lid 63. As the rotating opening/closing plate 66 rotates, its rice receiving hole 65 is selectively aligned with the rice receiving hopper 61 so that the rice from the rice discharge pipe 56 is allowed to be introduced in the rice cooker 62 through the rice receiving hopper 61 and the rice receiving hole 65. The rice contained in the rice cooker 62 is uniformly spread by a water supplied for a predetermined time of, for example, 2 to 3 seconds by a water supply motor 44 which will be described hereinafter.

Figure 2:
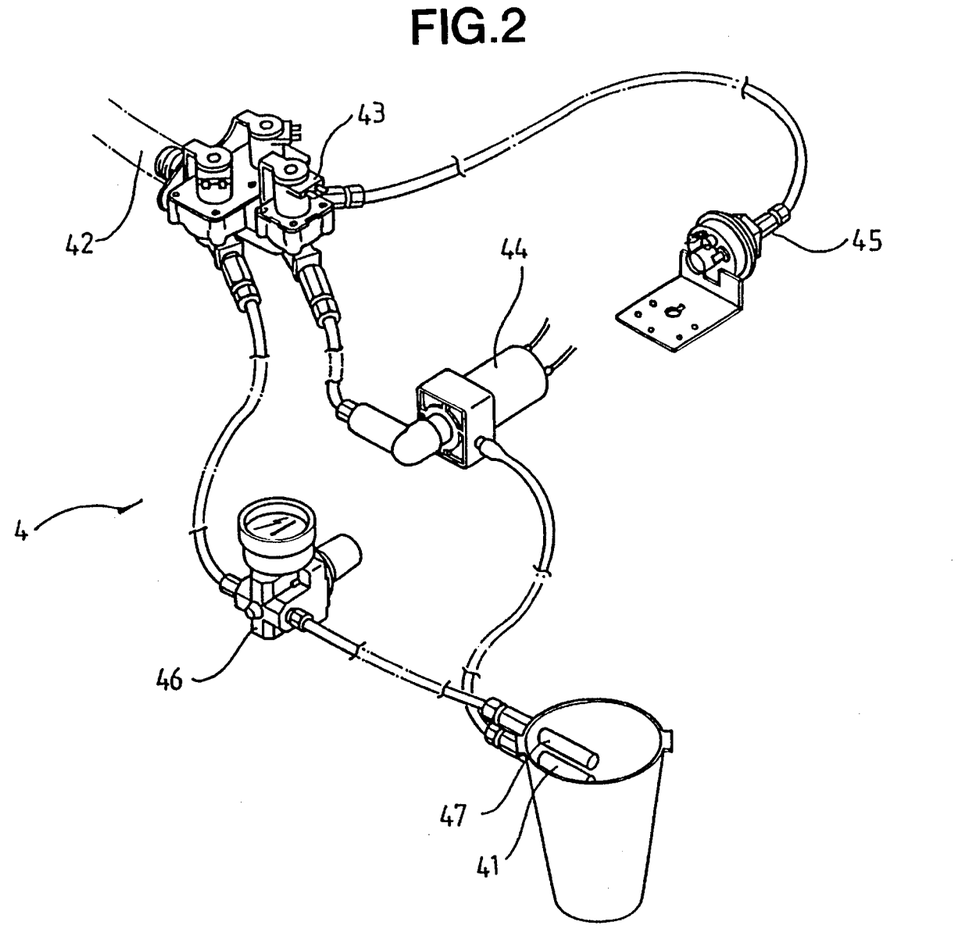
FIG. 2 is a perspective view of a water supply section constituting a part of the automatic rice cooking apparatus in accordance with the present invention.

FIG. 2 shows a water supply section constituting a part of the automatic rice cooking apparatus. As shown in FIG. 2, the water supply section has a water supply pipe 42 adapted to receive a water from an external water supply source not shown. To the water supply pipe 42, a solenoid valve 43 is connected. The water supply motor 44 which constitutes a part of the water supply section is connected to the solenoid value 43 so that it is supplied with the water from the water supply pipe 42 via the solenoid valve 43. The water supply section also has a water injection port 41 opened to the washing bath 35 of the rice washing section 3 and connected to the water supply motor 44 via a tube. By such a construction, a high pressure water from the water supply motor 44 can be injected at the water injection port 41 into the washing bath 35. The water supply section also has a water pressure sensor 45 adapted to sense a predetermined water pressure, for example, a pressure of 0.5 $Kg/cm^2$ in the water supply pipe 42. Only when a water pressure not lower than the predetermined pressure is sensed by the pressure sensor 45, the solenoid valve 43 is activated to supply the water from the water supply pipe 42 to the water supply motor 44. A pressure reducing valve 46 is also connected to the water supply pipe 42. The pressure reducing valve 46 serves to supply the amount of water for boiling the rice determined depending on the rice taste (state) under a water pressure of 0.5 $Kg/cm^2$ to a water supply port 47 opened to the washing bath 35. Accordingly, it is possible to accurately achieve the rice washing function and the rice-boiling water amount controlling function by the water supplied through the water injection port 41 and the water supplied through the water supply port 47, respectively.

Figure 3:
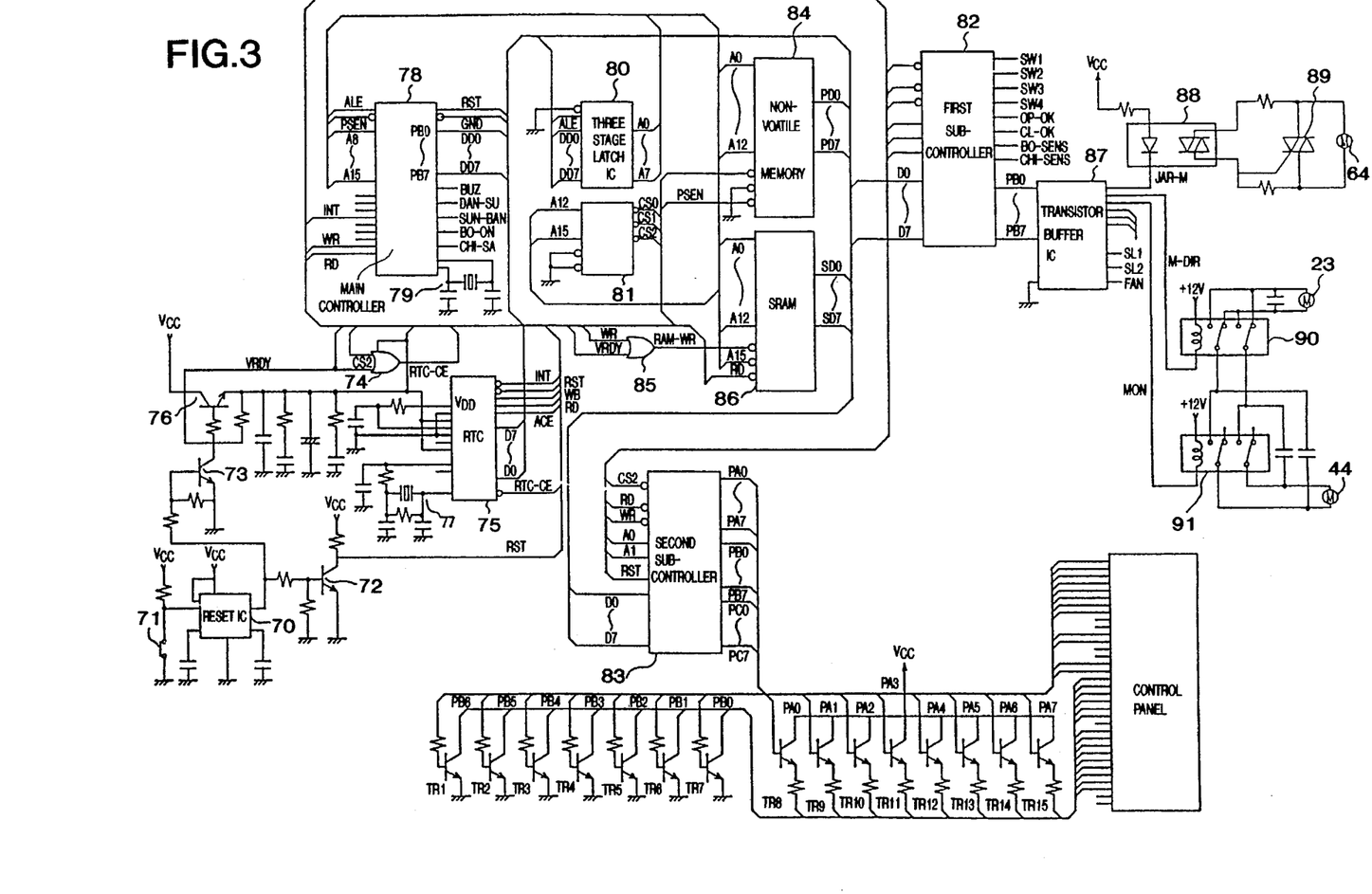
FIG. 3 is a circuit diagram illustrating a control circuit for controlling the automatic rice cooking apparatus in accordance with the present invention.
Figure 4:
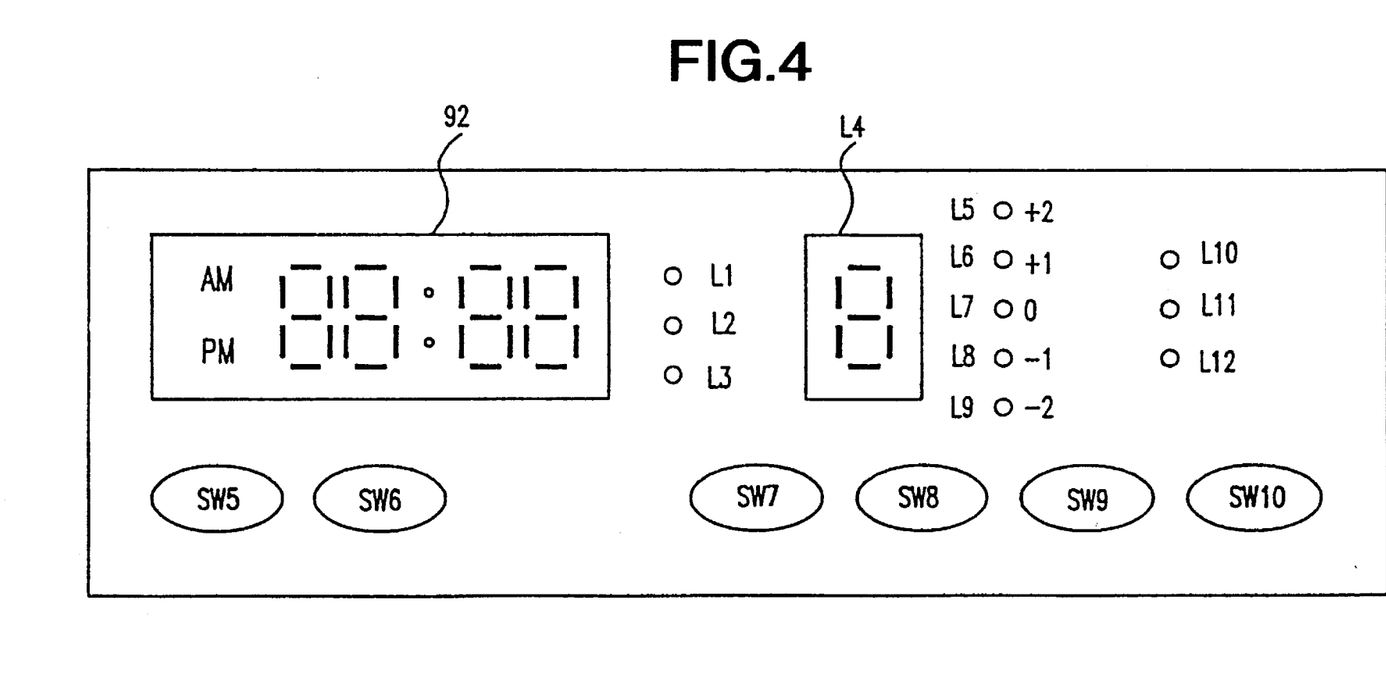
FIG. 4 is a schematic view illustrating a control panel constituting a part of the control circuit in accordance with the present invention.
Figure 5A:
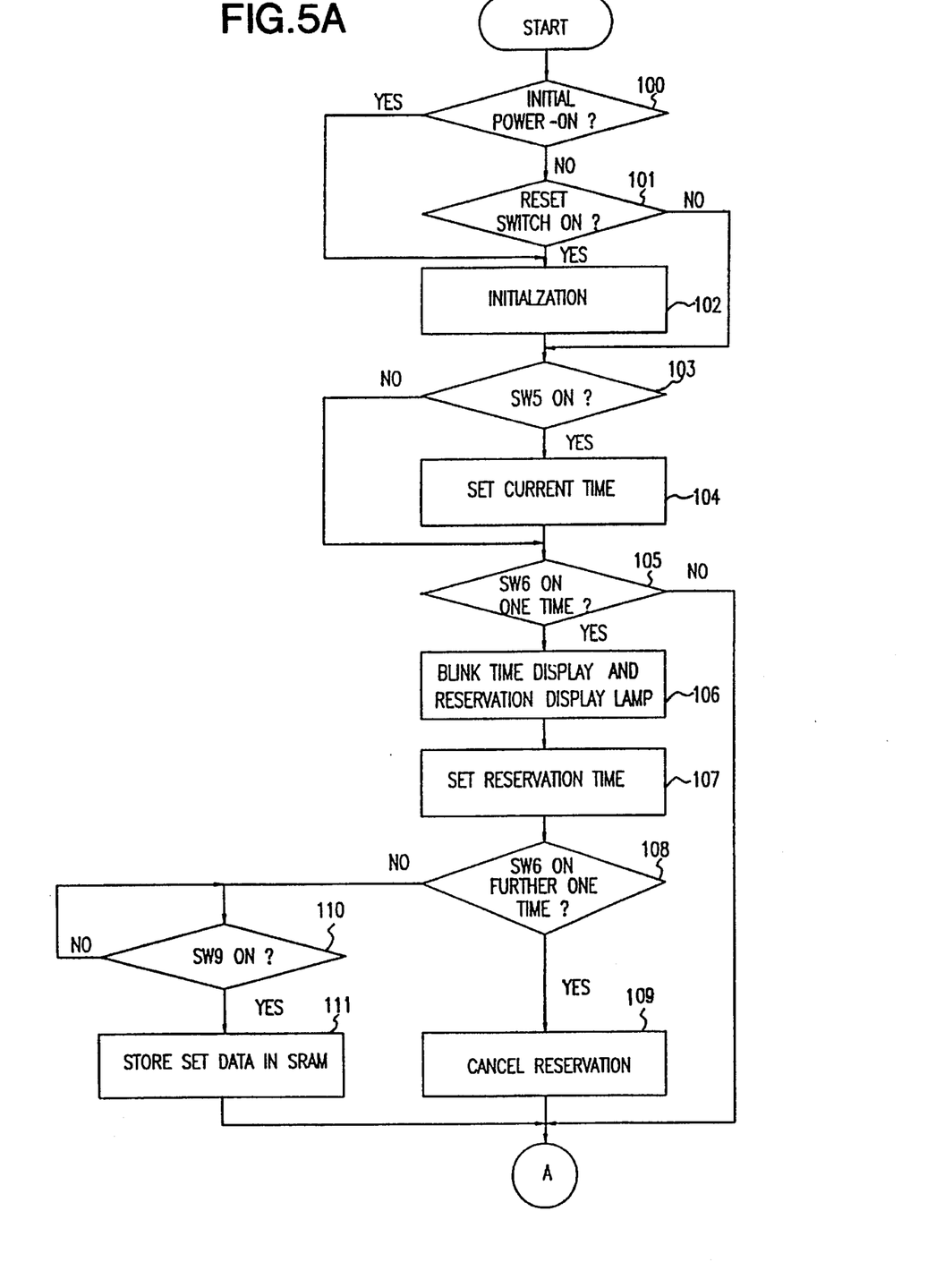
FIGS. 5A to 5D are flow charts respectively illustrating a method for controlling the automatic rice cooking apparatus in accordance with the present invention.
Figure 5B:
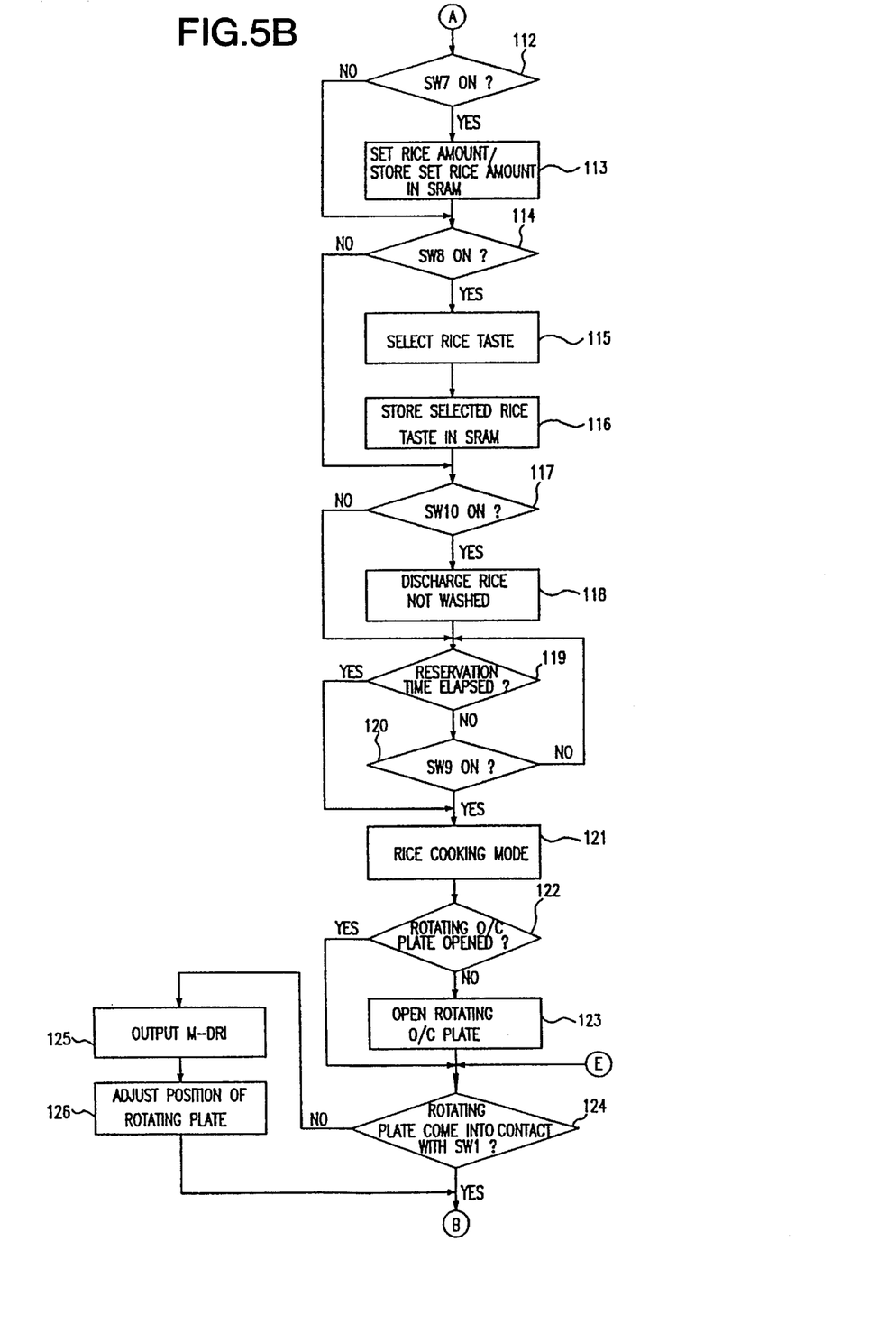
Figure 5C:
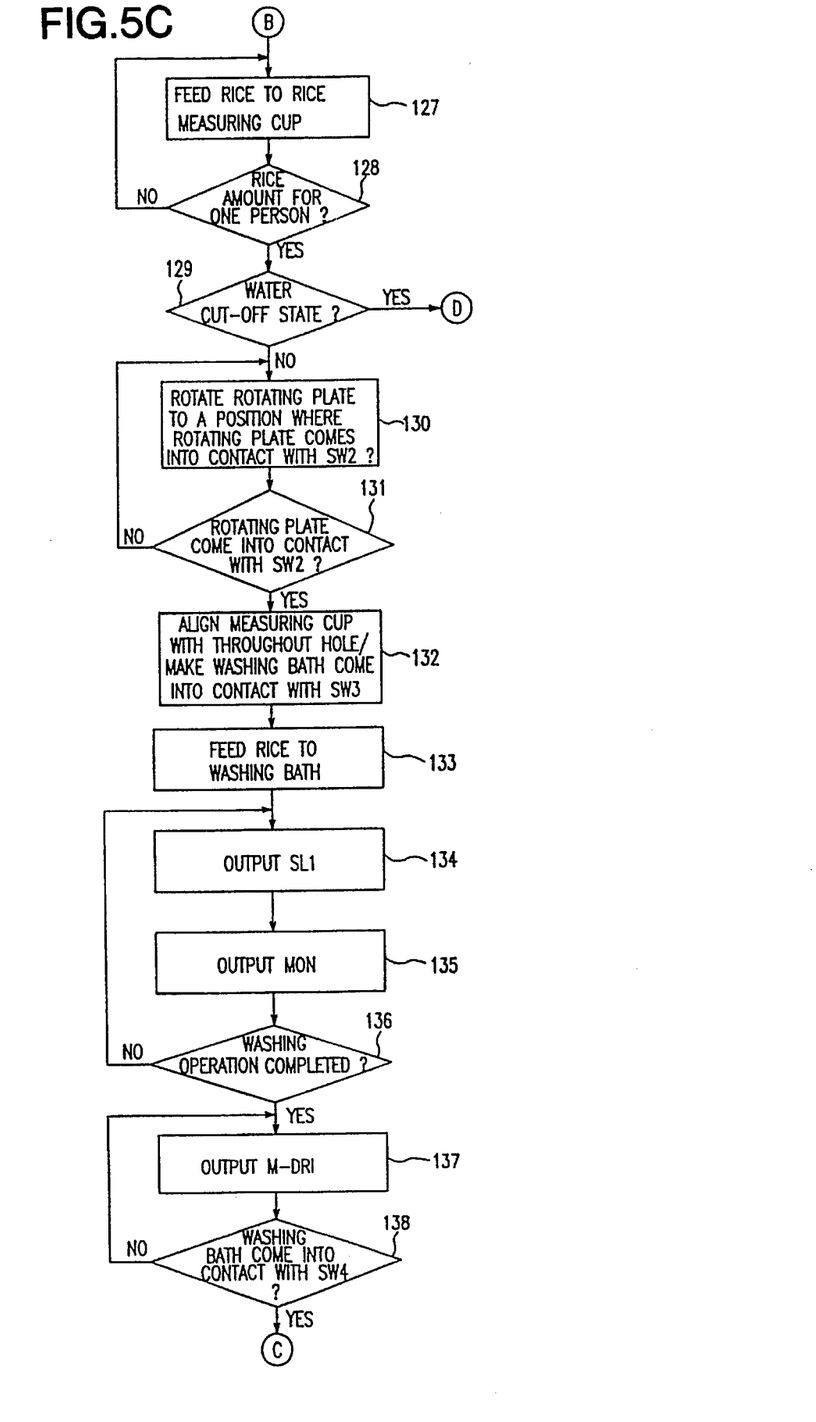
Figure 5D:
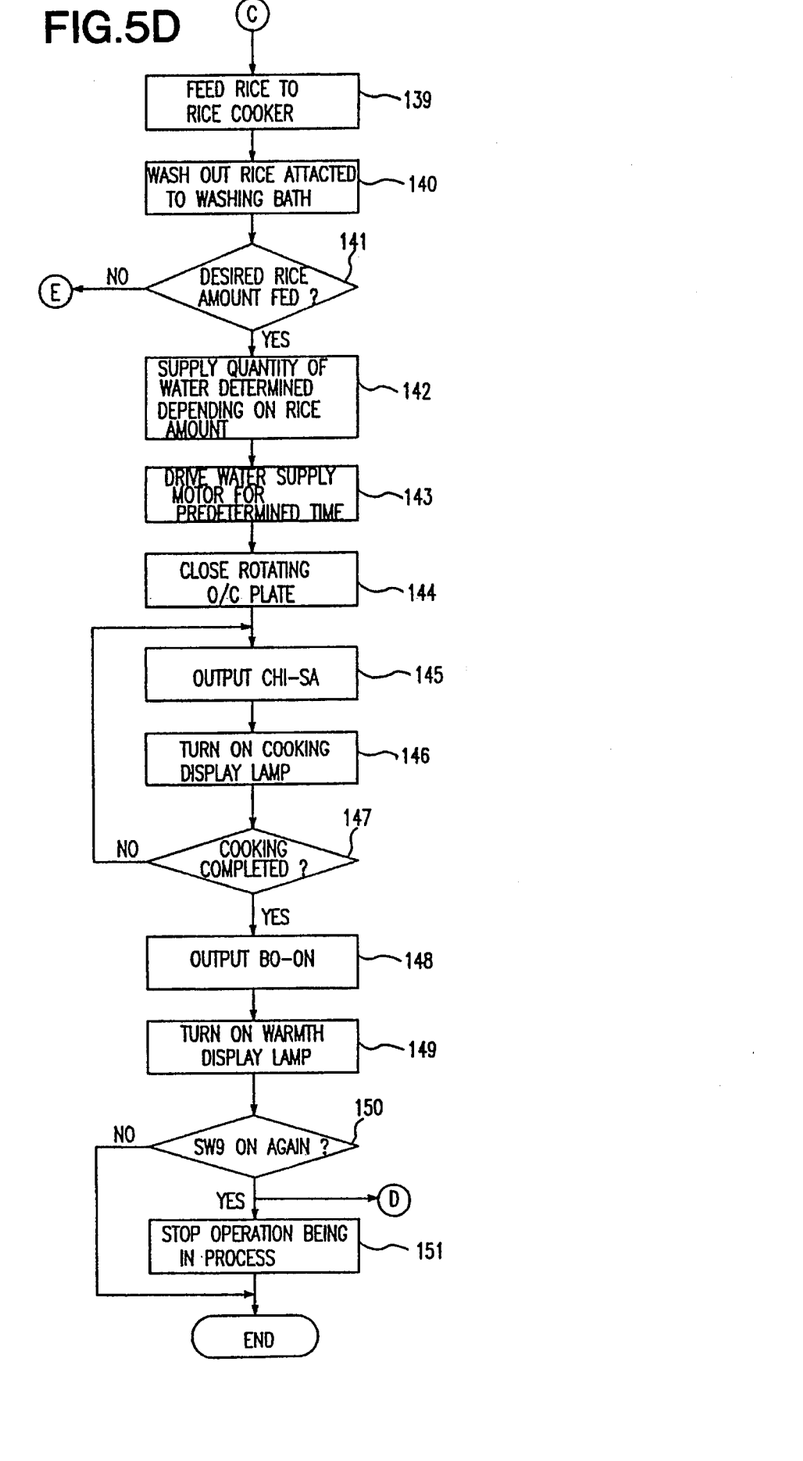

FIG. 3 shows a control circuit constituting a part of the automatic rice cooking apparatus. As shown in FIG. 3, the control circuit includes a reset integrated circuit (IC) 70 to which a reset switch 71 is connected. The reset IC 70 serves to output a high level signal when the automatic rice cooking apparatus is powered on or when the reset switch is switched on. The high level signal from the reset IC 70 is sent to a transistor 72 which, in turn, inverts the received signal to a low level signal to be used as a reset signal RST. The high level signal from the reset IC 70 is also applied to a transistor 73 which, in turn, inverts the received signal to a low level signal to be used as a voltage ready signal VRDY. An OR gate 74 is coupled to the transistor 73. The OR gate 74 receives at its input terminals the voltage ready signal VRDY and a chip selection signal CS2, respectively, and outputs a real time circuit (RTC) chip enable signal RTC-CE. Coupled to the output terminal of the OR gate 74 is an RTC 75. The RTC chip enable signal RTC-CE is applied to the RTC 75, thereby causing the RTC 75 to be activated. The RTC 75 has a source voltage input terminal $V_{DD}$ coupled to a transistor 76 which is connected to a voltage source Vcc. The transistor 76 applies an inverted high level signal to the source voltage input terminal $V_{DD}$ of the RTC 75. The RTC 75 also has oscillator input terminals OSC1 and OSC2 coupled to a crystal oscillator 77 which applies clock signals for time counting to the RTC 75. The RTC 75 is also coupled to the reset IC 70 so that it receives the reset signal RST from the reset IC 70. The RTC 75 serves to output an 8-bit data signal D0–D7 in accordance with time information.

The control circuit also includes a main controller 78 coupled to the reset IC 70, the crystal oscillator 79 and the RTC 75. Upon receiving the reset signal RST from the reset IC 70, the main controller 78 outputs an interrupt signal INT, an address latch enable signal ALE, a write signal WR and a read signal RD, thereby enabling the RTC 75 to output the data signal D0–D7 in accordance with various control times. The main controller 78 has input/output terminals PB0 to PB7 respectively for receiving the data signal D0–D7 in accordance with the time information. In response to the receipt of the data signal D0–D7, the main controller 78 outputs a ROM selection signal PSEN, a buzzer driving signal BUZ, a water cut-off control signal DAN-SU, a shelf control signal SUN-BAN, a warmth control signal BO-ON, a cooking control signal CHI-SA, the ninth bit A8 to sixteenth bit A15 of a 16-bit address signal and an 8-bit data signal DD0–DD7 so as to control the overall operation of the automatic rice cooking apparatus.

A three-state latch IC 80 is coupled to the main controller 78. The three-state latch IC 80 receives the address latch enable signal ALE as its output enable signal and the data signal DD0–DD7 from the main controller 78 as its input signals and thereby outputs the first bit A0 to eighth bit A7 of the address signal.

A 3-input/8-output demultiplexor IC 81 is also coupled to the main controller 78 to receive the thirteenth bit A12 to fifteenth bit A14 of the address signal as its input signal and the sixteenth bit of the address signal as its enable signal. On the basis of the received signals, the demultiplexor IC 81 outputs selectively high level signals as a chip selection signal CS0 for a first sub-controller 82, a chip selection signal CS1 for a second sub-controller 83 and a chip selection signal CS2 for the RTC 75.

A non-volatile memory 84 is also coupled to the main controller 78 to receive the ROM selection signal PSEN as its output enable signal. The non-volatile memory 84 also receives the first bit A0 to thirteenth bit A12 of the address signal from the three-state latch IC 80 and the main controller 78. In response to the receipt of the signals, the non-volatile memory 84 outputs a program data signal PD0–PD7 in accordance with a program stored therein.

The control circuit also includes a static random access memory (SRAM) 86 coupled to the main controller 78. The SRAM 86 receives the voltage ready signal VRDY and the write signal WR from the main controller 78 via an OR gate 85 as its RAM write signal RAM-WR. The SRAM 86 receives the read signal RD as its output enable signal and the sixteenth bit A15 of the address signal as its chip enable signal. The SRAM 86 serves to store data in memory locations respectively corresponding to addresses designated by the first bit A0 to thirteenth bit A12 of the address signal in accordance with a selected specification of the user and an operating being in process and then output stored data signal SD0–SD7 in accordance with a requirement.

The first sub-controller 82 also constitutes a part of the control circuit. The first sub-controller 82 receives the chip selection signal CSO, the read signal RD, the write signal WR, the first bit A0 and second bit A1 of the address signal as its port selection signal, and the reset signal RST. The first sub-controller 82 receives output signals from first and second limit switches SW1 and SW2 both for recognizing the rotated position of the measuring cup 28 (FIG. 1) of the measuring section 2, third and fourth limit switches SW3 and SW4 both for recognizing the rotated position of the washing bath 35 (FIG. 1) of the rice washing section 3, an opening sensor OP-OK for sensing the opening state of the rotating opening/closing plate 66 (FIG. 1) of the rice cooker 62, a closing sensor CL-OK for sensing he closing state of the rotating opening/closing plate 66, a warmth sensor BO-SENS of the rice cooker 62 and tile cooking sensor CHI-SENS of tile rice cooker 62. On the basis of the received signals, the first sub-controller 82 applies the data signal P0–P7 to the main controller 78. The first sub-controller 82 also receives the program data signal PD0–PD7 from the non-volatile memory 84 and the stored data signal SD4–SD7 from the SRAM 86. The first sub-controller 82 has output terminals PB0 to PB7 to which a transistor buffer IC 87 is coupled. The transistor buffer IC 87 outputs a cooker motor signal JAR-M upon receiving an output signal from tile first sub-controller 82. The cooker motor signal JAR-M is applied to a phototransistor 88 which serves to selectively activate a triac 89 for activating the motor 64 of the rice cooker 62. The transistor buffer IC 87 also serves to apply a motor drive signal M-DRI to a relay 90 for driving the motor 23 (FIG. 1) of the measuring section 2, to apply a motor drive signal MON to a relay 91 for driving the water supply motor 44 (FIG. 1), to output solenoid signals SL1 and SL2 for activating the solenoid 43 (FIG. 2), and to output a fan drive signal FAN for driving an inner fan.

The second sub-controller 83 also constitutes a part of the control circuit. The second sub-controller 83 receives the chip selection signal CS1, tile read signal RD, the write signal WR, the first bit A0 and second bit A1 of the address signal as its port selection signal, and the reset signal RST. The second sub-controller 83 receives tile selected specification of the user through a time button SW5, a reservation/ cancel button SW6, a rice amount button SW7, a taste button SW8, an operation/cancel button SW9 and a rice discharge button SW10 and sends it to the main controller 78 and sends the received signals to the main controller 78. The second sub-controller 83 serves to activate transistors TR1 to TR7 respectively for turning on 7 segments of light emitting diodes and selectively activate transistors TR8 to TR15 so as to enable a sequential turn-on operation for selectively turning on a time display unit 92, a reservation display lamp L1, a shelf opening display lamp L2, a water cut-off display lamp L3, a rice amount display lamp L4, taste display lamps L5 to L9 respectively for displaying various rice tastes including a hard rice taste, a slightly hard rice taste, a regular rice taste, a slightly soft rice taste and a soft rice taste, an in-operation display lamp L10, a cooking display lamp L11 and a warmth display lamp L12.

Now, a procedure of controlling the automatic rice cooking apparatus using the control circuit in accordance with the present invention will be described in conjunction with flow charts of FIGS. 5A to 5D.

When the user powers on the automatic rice cooking apparatus initially (Step 100) or turns on the reset switch 71 (Step 101), the reset IC 70 is activated to output a reset signal RST and thereby initialize the controllers 78, 82 and 83 (Step 102).

Once the initialization is completed, the time button SW5 is pressed (Step 103). As the time button SW5 is pressed, setting of the current time is executed (Step 104). The current time is set in a manner that the minute part thereof is incremented depending on the number of times pressing the time button SW5 and the time pressing the time button SW5 and that AM and PM parts thereof are changed to each other at intervals of a 12-hour increase of the hour part thereof.

When the reservation/cancel button SW6 is pressed one time by the user to reserve a rice cooking time (Step 105), the time display 92 and the reservation display lamp L1 are b blinked (Step 106). Thereafter, setting of the reservation time is executed and the set reservation time is displayed on the time display 92 (Step 107). The reservation time is set by pressing the time button SW5.

Where the reservation/cancel button SW6 is further pressed one time (Step 108), the set reservation is canceled (Step 109). When the operation/cancel button SW9 is pressed one time under the condition that the reservation/ cancel button SW6 has been pressed only one time, the reservation data is stored in the SRAM 86 (Step 111).

Where the user desires an amount of rice for at least two persons, the rice amount button SW7 is pressed to set the desired rice amount (Step 112). The rice amount is set in a manner that a numeric displayed by the rice amount display lamp L4 is incremented from two depending on the number of times pressing the rice amount button SW7. Data about the rice amount is also stored in the SRAM 86 (Step 113).

When the user presses the taste button SW8 (Step 114), the taste display lamps L5 to L9 for displaying various states of boiled rice are sequentially turned on depending on the number of times pressing the taste button SW8 so that the user selects a desired taste of boiled rice from a hard rice taste (+2), a slightly hard rice taste (+1), a regular rice taste (0), a slightly soft rice taste (−1) and a soft rice taste (−2) (Step 115). The data about the selected rice taste is stored in the SRAM 86 (Step 116).

If the user desires to take rice for a purpose other than the cooking purpose, he presses the rice discharge button SW10 (Step 117). As the rice discharge button SW10 is pressed, rice not washed is discharged in the amount displayed on the rice amount display lamp L4 (Step 118).

When the current time has reached the reservation time (Step 119) or when the operation/cancel button SW9 is pressed one time under a condition that no reservation has been made (Step 120), the main controller 78 recognizes this state and then executes an operation in a cooking mode (Step 121).

In the cooking mode, the main controller 78 checks whether the rotating opening/closing plate 66 of the rice cooking section 6 is maintained at its opening state, on the basis of output signals from the opening sensor OP-OK and the closing sensor CL-OK provided at the rice cooker 62 (Step 122). When the rotating opening/closing plate 66 is maintained at its closing state, the main controller 78 outputs a cooker motor drive signal JAR-M and thereby activates the transistor 88 and the triac 89 so that the drive motor 64 is driven to rotate the rotating opening/closing plate 66, thereby causing the rotating opening/closing plate 66 to be maintained at its closing state (Step 123).

Thereafter, the main controller 78 checks whether the rotating plate 25 of the measuring section 2 is positioned at a position where it is in contact with the first limit switch SW1, that is, the throughout hole 26 thereof is aligned with the outlet 15 of the rice box 11 (Step 124). Where the rotating plate 25 is not positioned at the above-mentioned position, the main controller 78 outputs a motor drive signal M-DRI to activate the relay 90 and thereby the motor 23 (Step 125). By the drive force of the motor 23, the rotating plate 25 rotates until the throughout hole 26 thereof is aligned with the outlet 15 6f the rice box 11 (Step 126).

When the throughout hole 26 of the rotating plate 25 is aligned with the outlet 15 of the rice box 11, the rice contained in the rice box 11 is downward discharged into the measuring cup 28 through the outlet 15 of the rice box 11, tile throughout hole 22 of the upper plate 21 and the throughout hole 26 of the rotating plate 25 (Step 127). When a rice amount for one person is contained in the measuring cup 28 (Step 128), the main controller 78 checks whether the water pressure sensor 45 has sensed a water cut-off state corresponding to a water pressure not more than a predetermined water pressure of, for example, 0.5 Kg/cm$^2$ (Step 129). If no water cut-off state has been sensed, the motor 23 is then driven so that the rotating plate 25 rotates to a position where the throughout hole 26 thereof is misaligned from the throughout hole 22 of the upper plate 21, that is, it is in contact with the second limit switch SW2, thereby preventing the rice contained in the rice box 11 from being downward discharged (Step 130).

When the rotating plate 25 comes into contact with the second limit switch SW2 as it rotates together with the rice washing section 3 coupled thereto by the rotating shaft 24 (Step 131), the measuring cup 28 is aligned with the throughout hole 32 of the measuring cup support plate 31. At this time, the upper inner plate 36 of the rice washing section 3 comes into contact with the third limit switch SW3 (Step 132).

At the state that tile upper inner plate 36 is in contact with the third limit switch SW3, the rice amount for one person contained in the measuring cup 28 is downward discharged through the throughout hole 32 of the upper inner plate 36 (Step 133). The main controller 78 detects this state and thereby outputs the solenoid signal SL1. In response to the solenoid signal SL1, the solenoid 43 is activated to open its water supply motor-side outlet (Step 134). Thereafter, the main controller 78 outputs the motor drive signal MON to activate the water supply motor 44 so that a high pressure water is injected into the washing bath 35 through the water injection port 41, thereby enabling the rice to be washed (Step 135).

During the washing, the water used to wash the rice is discharged out of the washing bath 35 through the water drain ports 38 and then drained out of the rice washing section 3 through the water drain ports 53.

When the washing of the rice has been completed (Step 136), the main controller 78 outputs the motor drive signal M-DRI to drive the motor 23 so that the washing bath 35 rotates together with the measuring cup 28 (Step 137). The rotation of the washing bath 35 is continued until the upper inner plate 36 comes into contact with the fourth limit switch SW4. At this state, the washing bath 35 is aligned with the rice discharge pipe 56 (Step 138).

Since the rotating opening/closing plate 66 is maintained at the opening position where the rice receiving hole 65 thereof is aligned with the rice receiving hopper 61 at the above-mentioned state of the step 138, the rice contained in the washing bath 35 is naturally dropped into the rice cooker 62 through the rice receiving hopper 61 and the rice receiving hole 65 (Step 139).

Thereafter, the solenoid signal SL2 is generated so that a water of a predetermined pressure is supplied to the washing bath 35 via the solenoid 43 and the pressure relief valve 46 (Step 140). The supplied water serves to wash out the rice attached to the inner surface of the washing bath 35 and feed the detached rice to the rice cooker 62. When the rice amount selected by the user is totally fed to the rice cooker 62 (Step 141), a water is fed to the rice cooker 62 via the pressure relief valve 46 and the water supply port 47. At this time, the water supply time is controlled depending on the selected rice amount to supply an appropriate amount of water corresponding to the rice taste selected from the hard rice taste, the slightly hard rice taste, the regular rice taste, the slightly soft rice taste and the soft rice taste by manipulating the taste button SW8 (Step 142). Subsequently, the solenoid signal SL1 and the motor drive signal MON are outputted so as to drive the water supply motor 44 for a predetermined time. As the water supply motor 44 is driven, a high pressure water is supplied to the rice cooker 62, thereby causing the rice contained in the rice cooker 62 to be uniformly spread in the interior of the rice cooker 62 (Step 143). Thereafter, the motor 64 is driven to rotate the rotating opening/closing plate 66 until the rice receiving hole 65 is misaligned from the rice receiving hopper 61 (Step 144).

The cooking control signal CHI-SA is outputted to execute a cooking operation of the rice cooker (Step 145). At this time, the cooking display lamp L11 is also turned on to inform of the cooking operation (Step 146).

When the cooking operation sensor CHI-SENS senses the completion of the cooking operation (Step 147), a warmth-keeping control signal BO-ON is outputted to execute a warmth-keeping operation (Step 148). At this time, the warmth display lamp L12 is also turned on to inform of the warmth-keeping state (Step 149).

When the operation/cancel button SW9 is further pressed one time during the above operation (Step 150), the operation being in process is immediately stopped and inputting of a next selection is executed (Step 151).

As apparent from the above description, the present invention provides an automatic rice cooking apparatus capable of automatically achieving all rice cooking procedures of measuring the amount of rice to be cooked, washing the rice, adjusting the quantity of water for boiling the rice, cooking the rice and keeping the cooked rice warm, and control circuit and method for controlling the automatic rice cooking apparatus. In accordance with the present invention, therefore, it is possible to achieve a convenient, simple and stable cooking of rice.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for automatically cooking rice, comprising:

a rice receiving section having a rice box provided at a front wall thereof with a rice inlet port and a window for checking the interior of the rice box;

a measuring section disposed beneath the rice receiving section, the measuring section having an upper plate attached to a lower end of the rice receiving section and provided with a throughout hole communicated with an outlet of the rice box, a rotating plate disposed beneath the upper plate and provided with a throughout hole, the rotating plate being rotated by a motor such that the throughout hole thereof is selectively aligned with the throughout hole of the upper plate, the measuring section further having a measuring cup attached to a lower end of the rotating plate;

a rice washing section disposed beneath the measuring section, the rice washing section having a measuring cup support plate provided with a throughout hole communicated with an opened lower end of the measuring cup and a washing bath attached to a lower end of the measuring cup support plate and provided with a plurality of water drain ports, the washing bath being coupled to the rotating plate by a rotating shaft such that they rotate together;

a water supply section having a water supply pipe adapted to receive a water from an external water supply source, a water supply motor connected to the water supply pipe, a water injection port connected to the water supply motor and opened to the washing bath, a pressure reducing valve connected to the water supply pipe, a water supply port connected to the pressure reducing valve and opened to the washing bath, and a water pressure sensor adapted to sense a water pressure in the water supply pipe and thereby check a water cut-off state;

to a water drain section disposed beneath the rice washing section, the water drain section having a rice discharge pipe selectively aligned with an opened lower end of the washing bath and a water collecting chamber for collecting a water drained from the washing bath, and water drain ports for draining the water collected in the water collecting chamber; and a rice cooking section disposed beneath the water drain section, the rice cooking section having a rice receiving hopper disposed beneath the rice discharge pipe and adapted to receive a washed rice from the rice washing section, a rice cooker laid on a slidable shelf, and a rotating opening/closing plate provided with a rice receiving hole and adapted to rotate by a motor such that it allows selectively the rice cooker to receive the rice from the rice receiving hopper through the rice receiving hole.

2. The apparatus for automatically cooking rice of claim 1, including a circuit for controlling the apparatus, said circuit comprising:

a reset integrated circuit adapted to output a reset signal when the automatic rice cooking apparatus is powered on or when a reset switch is switched on;

a real time circuit activated by an output signal from an OR gate receiving a voltage ready signal from the reset integrated circuit and a chip selection signal, the real time circuit receiving pulses from a crystal oscillator and thereby outputting an 8-bit data signal in accordance with time information;

a main controller adapted to receive the reset signal from the reset integrated circuit and the data signal from the real time circuit and output an interrupt signal, an address latch enable signal, a write signal and a read signal, a ROM selection signal, the ninth bit to sixteenth bit of a 16-bit address signal and the data signal, a buzzer driving signal, a water cut-off control signal, a shelf control signal, a warmth control signal and a cooking control signal, the main controller serving to control the overall operation of the control circuit;

a three-state latch integrated circuit adapted to receive the address latch enable signal and the data signal from the main controller and output the first bit to eighth bit of the address signal;

a 3-input/8-output demultiplexor integrated circuit adapted to receive the thirteenth bit to fifteenth bit of the address signal as its input signal and the sixteenth bit of the address signal as its enable signal and output chip selection signals;

a non-volatile memory adapted to receive the ROM selection signal as its output enable signal and the first bit to thirteenth bit of the address signal and output an 8-bit program data signal in accordance with a program stored therein;

a static random access memory adapted to receive the voltage ready signal and the write signal from the main controller via an OR gate as its RAM write signal, the read signal and the sixteenth bit of the address signal as its chip enable signal, store data in memory locations respectively corresponding to addresses designated by the first bit to thirteenth bit of the address signal and then output the stored data in accordance with a selected specification of a user and an operation being in process;

a first sub-controller adapted to receive a selected one of the chip selection signals, the read signal, the write signal, the first and second bits of the address signal as its port selection signal, and the reset signal, transmit to the main controller output signals from first and second limit switches both for recognizing the rotated position of the measuring cup of the measuring section, third and fourth limit switches both for recognizing the rotated position of the washing bath of the rice washing section, an opening sensor for sensing an opening state of the rotating opening/closing plate of the rice cooker, a closing sensor sensing a closing state of the rotating opening/closing plate, a warmth sensor of the rice cooker and a cooking sensor of the rice cooker, and selectively output a cooker motor signal, motor drive signals, solenoid signals and a fan drive signal; and a second sub-controller adapted to receive another selected one of the chip selection signals, the read signal, the write signal, the first bit and second bit of the address signal as its port selection signal, and the reset signal, transmit to main controller the selected specification of the user selected through a time button, a reservation/cancel button, a rice amount button, a taste button, an operation/cancel button and a rice discharge button, activate transistors for selectively turning on a time display unit, a reservation display lamp, a shelf opening display lamp, a water cut-off display lamp, a rice amount display lamp, taste display lamps, an in-operation display lamp, a cooking display lamp and a warmth display lamp.

* * * * *